United States Patent [19]

Lowery et al.

[11] 4,405,688

[45] Sep. 20, 1983

[54] MICROPOROUS HOLLOW FIBER AND PROCESS AND APPARATUS FOR PREPARING SUCH FIBER

[75] Inventors: James J. Lowery, Charlotte, N.C.; Neil D. Plotkin, Scotch Plains, N.J.; Jack Robinson, Waxhaw, N.C.

[73] Assignee: Celanese Corporation, New York, N.Y.

[21] Appl. No.: 349,795

[22] Filed: Feb. 18, 1982

[51] Int. Cl.³ .............................................. D02G 3/00
[52] U.S. Cl. ................................. 428/398; 210/500.2; 264/177 F
[58] Field of Search .............................. 428/398, 376; 210/500.2, 500.1; 264/177 F, 41

[56] References Cited

U.S. PATENT DOCUMENTS 3,423,491  1/1969  McLain et al. ................. 428/398 X
4,020,230  4/1977  Mahoney et al. ................... 428/398
4,055,696  10/1977  Kamada et al. ..................... 428/398

FOREIGN PATENT DOCUMENTS 2041821  9/1980  United Kingdom ............ 264/177 F

*Primary Examiner*—Lorraine T. Kendell
*Attorney, Agent, or Firm*—Robert J. Blanke

[57] ABSTRACT

The present invention provides microporous hollow fiber with improved structural and performance characteristics and a process and apparatus for preparing the improved fiber. The microporous hollow fiber possesses substantially uniform wall thickness, cross-sectional dimensions and porosity. Such characteristics are obtained by melt spinning hollow fiber precursor under defined conditions in a substantially vertically upward direction and subjecting the precursor to a symmetrical quenching step which may be achieved using a hollow annular structure surrounding the precursor. The structure, which is connected to a source of gas, has one or more openings on its inner surface that distribute the gas against the precursor in a substantially uniform manner.

5 Claims, 4 Drawing Figures

MICROPOROUS HOLLOW FIBER AND PROCESS AND APPARATUS FOR PREPARING SUCH FIBER

BACKGROUND OF THE INVENTION

The present invention relates to microporous polyolefinic hollow fibers having improved characteristics, and to a process and apparatus for preparing such fibers. It particularly relates to improvements in the spinning of hollow polyolefinic precursor fibers which yield microporous hollow fibers having improved structural and performance characteristics.

Hollow porous fibers are well known in the art. See, for example, U.S. Pat. Nos. 4,020,230; 4,082,658, and 4,214,020, as well as European Published Patent Application No. 0 005 866, published Dec. 12, 1979. The advantages of permeable hollow fibers over permeable films are also well known. For example, porous hollow fibers possess a larger surface area per unit volume than a flat film of similar porous configuration. Consequently, there has been a growing tendancy to employ, if possible, hollow microporous fibers in those applications typically reserved for permeable films.

One particular important use for hollow microporous fibers is as a blood oxygenator as illustrated by U.S. Pat. No. 4,020,230 which discloses hollow microporous fibers prepared from polyethylene. As is well known the properties required in a blood oxygenator membrane include good gas permeability with respect to gaseous oxygen and carbon dioxide, chemical stability, blood compatibility or substantially non-thrombogenic behavior in blood containing environments, sufficiently hydrophobic character to serve as a water vapor barrier, ease in manufacture, nontoxicity, relative inertness to body fluids, and mechanical strength and handling properties adequate for facilitating the assembly and use of blood oxygenation devices.

Microporous polypropylene films have previously been employed as blood oxygenation membranes and such films have been found to meet all of the above requirements. However, because of the relatively low surface area of such films, relatively large volumes of blood must be removed from the body to achieve the required oxygen and carbon dioxide gas transfer. In contrast, hollow polypropylene microporous fibers offer the advantage of being able to achieve the same gas transfer using much lower volumes of blood.

According to one known technique for preparing hollow polyolefinic microporous fibers, hollow precursor fibers are melt spun, annealed, stretched to open up the crystalline structure of the polymer and to impart microporosity thereto, and then heat set to stabilize the resulting microporous structure. Commonly assigned U.S. patent application Ser. No. 11,740, filed Feb. 13, 1979 in the names of Howard J. Davis, Willard C. Brinegar, Phillip L. Scoville and Peter K. Sullivan, entitled "Process for Preparing Hollow Microporous Polypropylene Fibers", for example, discloses a process for preparing hollow open-celled polypropylene microporous fibers having an oxygen flux of at least 35 cc/cm$^2$. min. at 10 psi which comprises (a) melt spinning a hollow non-porous polypropylene precursor fiber having an average inner diameter of at least 140 microns, an average inner diameter to average wall thickness ratio of from about 8:1 to about 40:1, an elastic recovery from 50% extension at 25° C., 65% relative humidity and zero recovery time of at least 50% and degree of orientation as determined from the half width of the wide angle (110) X-ray diffraction arc of not greater than 25° from isotatic polypropylene having a melt index of at least 1 at a spinning temperature of at least 230° C. and a drawdown ratio of at least about 40; (b) annealing the precursor fibers at a temperature between about 50° C. and 165° C. for a period from about 0.5 second to about 24 hours; (c) cold stretching the non-porous annealed precursor fibers at a temperature of less than about 100° C. followed by hot stretching the precursor fibers at a temperature above 100° C. with a total degree of combined stretching of from 80 to about 200%; and (d) heat setting the resulting stretched fibers under tension to produce open celled hollow microporous polypropylene fibers having an average inner diameter of at least 100 microns.

U.S. Pat. No. 4,055,696 describes a somewhat similar type of process for the preparation of microporous polypropylene hollow fibers wherein a cold stretching technique is employed to prepare the hollow polypropylene microporous fibers. This process requires that the size of the pores be kept within a specified range by limiting the degree and temperature of cold stretch to 30 to 200% of the original fiber length and less than 110° C., respectively. The resulting cold stretched fibers which have been previously annealed are heat set at a temperature at or above the initial annealing temperature, employed prior to stretching as described above. Annealed, cold stretched, heat set, hollow fibers prepared in accordance with this patent tend to exhibit varying degrees of shrinkage depending on the relationship of the prior annealing temperature and duration to the heat setting temperature and duration.

Japanese Kokai Patent No. Sho 53 [1978]-38715 published Apr. 10, 1978 is directed to an improvement in the method for preparing porous polypropylene hollow fibers disclosed in U.S. Pat. No. 4,055,696. The improvement comprises controlling the annealing temperature to be below 155° C. and controlling the heat setting temperature after cold stretching to be from 155° to 175° C. for from 3 seconds to 30 minutes.

Further improvements in the basic process of U.S. Pat. No. 4,055,696 are described in Japanese Kokai Patent Nos. Sho 54 [1979]-34418 and 68414. In the first of these publications, a hollow precursor fiber having a elastic recovery of at least 60% is stretched 30–400% and then heat set under conditions such that the fiber relaxes from 5–95% of its stretched length. In the second of these publications, the hollow precursor fiber is subjected to a cold-stretch, hot stretch stretching sequence and then heat set at a temperature of from 130°–165° C.

In the melt spinning of precursor for microporous hollow fibers, special characteristics must be imparted to the fiber. The most important are:
 (a) mechanical strength;
 (b) uniform geometric shape;
 (c) high molecular orientation to allow the generation of porosity in subsequent stretching operations; and
 (d) uniform molecular orientation throughout the hollow fiber structure so that uniform porosity results.

The traditional approach to the melt extrusion of polymeric hollow precursor fibers requires a source of molten, pressurized polymer, a die to form the hollow precursor fiber, a method of cooling the hollow precursor to a non-sticking solid, and a winding device. The usual arrangement of these elements is to have the molten polymer enter the hollow fiber-forming capillaries of the die from above. The molten fibers flow downward from the die, through a zone where cooling takes place, to the wind-up device.

Conventionally, the hollow precursor fiber is cooled (quenched) by passing an air stream across the hollow precursor fiber. In this type of cooling arrangement, any single filament sees only a cross flow of cooling air, i.e., the local velocity vector of the air impinges on only one side of the filament. Different portions of the hollow precursor fiber thus experience different degrees of quenching, resulting in variations in molecular orientation throughout the fiber, and ultimately in variations in porosity throughout the microporous hollow fiber as well as variations in the rate of cooling throughout the fiber leading to microporous hollow fibers with substantial variations in inner diameter and wall thickness.

Processing of polyolefins into high quality microporous hollow fibers has theretofore also been limited by the nonNewtonian nature of such polymers. As polyolefins such as polypropylene exit the die capillary, the melt expands in a phenomenon commonly referred to as die swell. Through a complex interaction of apparent extrusion viscosity, cooling rate at quench and applied stress, die swell makes spinning of a uniform microporous hollow fiber (MHF) precursor difficult in the traditional down spinning configuration. In addition, die swell tends to retard the drawdown of the hot extruded fiber and thereby to decrease the amount of stress applied to the hot precursor and at the same time the rate of cooling of the hot precursor. Since the amount of molecular orientation present in the precursor fiber is directly related to the amount of stress applied to the fiber as it exits the spinneret and the quench rate, die swell limits the amount of molecular orientation which can be imparted to the hot fiber by the traditional down spinning approach.

Since the degree of die swell increases with the molecular weight of the polyolefin, one approach to mitigating the problems associated with die swell has been to use lower molecular weight polymer (melt index greater than about 8 for polypropylene) and wind up the spun fiber at higher speeds (400–600 m/min). The lower M.W. resin exhibits lower viscosity exiting the spinneret. Die swell is reduced and the fiber draws down close to the spinneret. This allows for more rapid cooling because of the higher surface area and linear speed of the filament. The shortcomings of this process are in the inflexibility of resin choice and product porosity characteristics. Higher molecular weight resins are generally preferred since they result in stronger microporous hollow fiber with better resistance to degradation. In addition, the molecular weight of the resin has a strong influence on the size of the pores which form on stretching.

It is also known in the art that microporous polyolefinic films may be prepared by melt extruding a precursor film by the so-called blown film technique wherein a polyolefinic precursor film is extruded in the form of a hot tube which is expanded by internal air pressure as it exits the die. In Example IX of U.S. Pat. No. 3,558,764, for example, a polyethylene precursor film is melt extruded at 380° F. in the form of a hot tube, expanded 1.5 times in diameter by internal air pressure and then cooled using an air ring located above the extrusion die. In this regard, see also U.S. Pat. Nos. 3,679,538; 3,801,404; 3,801,692; and 3,839,240. Extrusion of precursor films by the blown film technique is not analogous, however, to the spinning of hollow precursor fibers. With the blown film technique, die swell does not effect the blowing of the hot film and is thus not a problem. In contrast, in the spinning of hollow precursor fibers, the inner diameter of the hollow precursor fiber decreases relative to its extruded size. Die swell retards this desired reduction in fiber inner diameter resulting in the disadvantages noted above.

It would thus be desirable to provide a new method for spinning polyolefinic precursor fibers which overcomes the disadvantages of the prior art and which results in novel microporous hollow fibers having a unique combination of physical characteristics and performance.

SUMMARY OF THE INVENTION

Accordingly, it is a general object of the present invention to provide microporous hollow fibers having improved characteristics.

It is a more specific object of the present invention to provide microporous hollow fibers having substantially uniform wall thickness and inner diameter throughout a cross-section taken perpendicular to the axis of the fiber.

It is another object of the present invention to provide microporous hollow fiber having a high permeability to oxygen and other gases.

It is yet another object of the present invention to provide microporous hollow fibers having substantially uniform porosity.

It is a further object of the present invention to provide an improved process for preparing microporous hollow fibers wherein polyolefinic material is melt spun at a defined temperature in a substantially vertically upward direction.

It is a still further object of the present invention to provide an improved process for preparing microporous hollow fibers wherein the melt spun polyolefinic material is quenched in a symmetrical flow of quenching medium.

It is yet a further object of the present invention to provide an apparatus for preparing improved microporous hollow fibers.

In accordance with the present invention, these and other objects are achieved through the provision of a novel microporous polyolefinic microporous hollow fiber having (a) an average wall thickness in the range of from about 1 to about 75 microns; (b) a coefficient of variation in wall thickness throughout a cross-section taken perpendicular to the axis of the fiber of less than about 20%, (c) an average inner diameter in the range of from about 5 to about 1500 microns; (d) a coefficient of variation in inner diameter throughout a cross-section taken perpendicular to the axis of the fiber of less than about 8%; and (e) a substantially uniform porosity across the circumference of the fiber as measured by the average ratio of the maximum pore density to the minimum pore density around the circumference of the fiber of less than about 3:1.

Preferred microporous polyolefinic hollow fibers in accordance with this invention have an improved structural uniformity characterized by a coefficient of variation of wall thickness of less than 10%, a coefficient of variation in inner diameter of less than 5%, and an average ratio of maximum pore density to minimum pore density around the circumference of the fiber of less than about 2:1.

The above-described microporous fibers are prepared by melt spinning non-porous hollow precursor fibers in a substantially vertically upward direction at a temperature of from about 10° to about 90° C. above the crystalline melting point of the polymer and then spin orienting the precursor fibers while subjecting the precursor to a symmetrical quenching step using a hollow annular structure surrounding the precursor which has one or more openings on its inner surface that distribute the quenching medium against the precursor in a substantially uniform manner. Following the spin orienting and quenching of the precursor, the hollow non-porous precursor fiber is converted into a microporous hollow fiber by stretching and heat setting the fiber. The precursor fiber may also optionally be annealed prior to stretching. In a further embodiment, the present invention thus also provides a process for manufacturing microporous polyolefinic hollow fibers.

Other objects and advantages, as well as the scope, nature and utilization of the invention will be apparent to those of ordinary skill in the art from the following detailed description of the preferred embodiments of the instant invention.

DETAILED DESCRIPTION OF THE PREFERRED EMBODIMENTS

Figure 1:
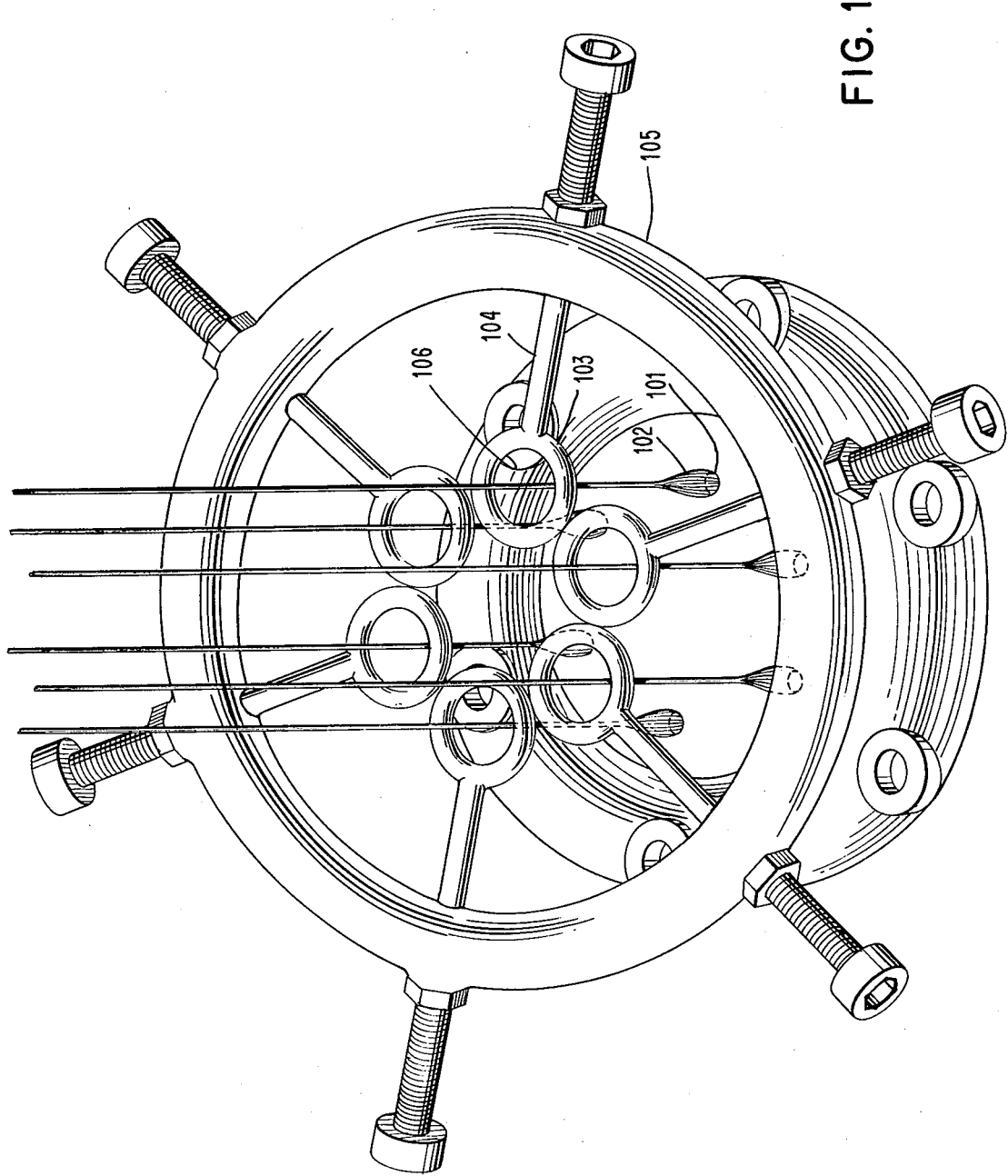
FIG. 1 is a perspective view from above of an apparatus for simultaneously spinning six hollow fiber precursors in accordance with one aspect of the present invention.

The essence of the instant invention comprises the instant inventors' discovery that a microporous polyolefinic hollow fiber having a novel combination of physical characteristics may be made by melt spinning of polyolefinic resin in a substantially vertically upward direction at a temperature of from about 10° to about 90° C. above the crystalline melting point of the polymer into a non-porous hollow precursor fiber while contacting the precursor with a substantially symmetric flow of a quenching medium such as air or other gas, and then converting the resulting non-porous hollow precursor fiber into a microporous hollow fiber by stretching the precursor fiber and then heat setting the stretched fiber. Preferably the precursor fiber is also annealed prior to stretching.

Surprisingly, the instant inventors have found that polyolefinic microporous hollow fibers produced by this method exhibit a greater and more uniform molecular orientation and porosity, a more uniformly round shape and a more uniform wall thickness. As a result of this unique combination of characteristics, the microporous hollow fibers of this invention exhibit not only higher gas permeabilities than the typical microporous hollow fibers of the prior art but in addition are mechanically stronger and more durable than the prior art fibers. A further advantage of upward extrusion is the ability to spin larger hollow fibers. Using the downspinning technique of the prior art, the internal diameter of the hollow-fiber is practically limited to a maximum of 300 microns with a 25 micron wall thickness using common fiber grade polyolefinic resins. Using upward extrusion, fibers with inner diameters as large as 1500 microns and 75 microns wall thickness may be spun with adequate orientation for conversion to the microporous state. In addition, a wider flexibility of resin choice is possible with the present process of producing polyolefinic microporous hollow fibers, both low melt index and high melt index resins being capable of use herein with equal advantage. This result is particularly surprising since with the downspinning technique of the prior art higher melt index resins are preferred due to their smaller die swell characteristics. The ability to utilize higher molecular weight (lower melt index) resins is an attractive advantage since they can be fabricated into a mechanically stronger fiber. The molecular weight of the resin can also be used to control the pore size of the fiber.

While not wishing to be bound by any particular theory, it is believed that the foregoing advantages result from the faster drawdown and cooling rate provided by the upspinning/symmetrical quench system of this invention than that provided by the downspinning/cross flow quench system of the prior art. With the upspinning technique of this invention, the filaments are drawn down to their final diameter much more quickly than with the downspinning technique of the prior art. This faster drawdown allows greater stress to be applied to the molten hollow fiber at extrusion and hence a higher degree of molecular orientation to be imparted to the fiber. Moreover, the faster drawdown allows for more rapid cooling of the fiber due to the higher surface area and linear speed of the filament which further enhances the molecular orientation of the precursor fiber.

Cooling of the molten precursor fiber is further improved by the substantially symmetrical quench system used herein. With the cross-flow quench system of the prior art, the side of the fiber opposite the source of the quench medium is quenched at a slower rate then the side directly in contact with the quench medium. As a result, different sides of the precursor fiber cool at different rates, resulting in a microporous hollow fiber having a non-uniform molecular orientation and porosity. In addition, the unequal cooling rates of different sides of the fiber result in a microporous hollow fiber having substantial variations in its wall thickness and shape. With the symmetrical quench system of this invention all sides of the fiber are contacted substantially uniformly with the quench medium, producing a faster and more even cooling of the fiber. The resulting microporous hollow fiber thus possesses a more uniform molecular orientation and porosity as well as a more uniform wall thickness and round shape.

The microporous hollow fiber of the present invention may be prepared from any suitable thermoplastic relatively crystalline polyolefinic material. Typically the polyolefinic material is characterized by the ability to be melt spun, to develop a row lamellar crystal structure, and possesses a low degree of side chain branching. Illustrative examples of suitable polyolefins include polyethylene, polypropylene, poly-3-methyl butene-1, poly-4-methyl pentene-1, copolymers of ethylene, propylene, 3-methyl butene-1, or 4-methyl pentene-1 with each other or with minor amounts of other olefins, e.g. copolymers of ethylene and propylene, copolymers of a major amount of 3-methyl butene-1 and a minor amount of a straight chain n-alkene having from 2 to 18 carbon atoms such as n-octene-1, n-hexadecene-1, n-octadecene-1 or other relatively long chain alkenes, as well as copolymers of 3-methyl pentene-1 and any of the same n-alkenes mentioned previously in connection with 3-methyl butene-1. These polymers in the form of fibers generally exhibit a crystallinity of at least 50%. The polyolefinic material may also include small amounts (e.g., less than about 20% by weight) of other materials which may be copolymerized or blended therewith, but which do not substantially adversely affect the characteristics of the polyolefinic material. A particularly preferred polyolefin is isotactic polypropylene having a weight average molecular weight in the range of from about 50,000 to about 600,000, preferably from about 100,000 to about 600,000; and a melt index in the range of from about 0.6 to about 35, preferably from about 0.6 to about 15, and most preferably from about 0.6 to about 8 (e.g. from about 1 to 5).

Also particularly preferred is high density polyethylene having a density greater than 0.960; a weight average molecular weight of from 50,000 to 600,000, preferably from about 100,000 to about 600,000; and a melt index of from about 0.5 to about 15, preferably from about 0.6 to about 8 and most preferably from about 0.6 to 5.

The term melt index as used herein is defined as the value obtained by performing ASTM D-1238 under conditions of temperature, applied load, timing interval and other operative variables which are specified therein for the particular polymer being tested, e.g., polypropylene.

The polyolefinic material is converted to a hollow precursor fiber by melt spinning. The terms "hollow precursor fiber" or "hollow fiber precursor" are used herein to define the spun hollow fiber prior to the completion of the stretching operation which imparts the desired porosity. The hollow precursor fiber is prepared from the molten polymer material which is caused to flow through one or more orifices (i.e., capillaries) of a spinneret that is capable of imparting the desired continuous hollow configuration to the fiber. For instance, in a preferred embodiment the melt is caused to flow through a die having one or more capillaries with a diameter in the range of from about 1 to about 8 mm and having further a needle with an end outer diameter in the range of from about 0.5 to about 7.5 mm extending into the central portion of each capillary. A fluid stream (e.g., air) is then passed through the needle as the melt is pumped through the capillary, thereby imparting a hollow configuration to the fiber.

As will be apparent to those of ordinary skill in the art, other spinning means may likewise be employed.

As mentioned above, an important aspect of the present invention is the orientation of the spinning means. More particularly, in contrast to known techniques wherein microporous hollow fiber is melt spun downwardly (i.e., in the direction of gravity), the present invention involves melt spinning in the substantially vertically upward direction.

By melt spinning in the substantially vertically upward direction, as discussed above, significant advantages may be achieved. As the polyolefinic material exits the die capillary, the melt expands in a phenomenon referred to as die swell. The faster the melt is drawn down to the desired size, the higher the degree of molecular orientation induced in the precursor fiber, which is a determining factor in the porosity of the final microporous hollow fiber. With up-spinning, faster draw down and thus higher molecular orientation may be obtained. For example, at a take-up speed of 200 m/min and down-spinning, polypropylene fiber could not be drawn down to the desired size until it was about 100 to 200 cm from the die face. Conversely, using the up-spinning technique of the present invention and an identical take-up speed, draw down can be accomplished within about 1 to about 10 cm.

The benefits of the high velocity drawdown characteristic of the present invention are particularly noticeable with polyolefinic resins having melt indexes of from about 0.6 to 8. While polyolefinic resins of both high and low melt index benefit from the improved processing conditions of this invention, due to their greater die swell the lower melt index resins, for example, isotatic polypropylene having a melt index of from about 0.6 to 8, will most noticeably benefit from the use of this invention. Due to the numerous advantages of upspinning discussed at length above, with the upspinning technique of the present invention, the lower melt index resins may thus be employed with equal advantage as the higher melt index resins (e.g. the 8 to 35 melt index resins) for the preparation of microporous hollow fibers, providing a greater flexibility in resin choice over that possible with the downspinning technique of the prior art.

Another important aspect of the present invention is the temperature at which the polyolefinic material is spun. In conjunction with other aspects of the present invention, it has been found that by spinning the polyolefinic material at a temperature in the range of from about 10° to about 90° C. above the material's crystalline melting point, improved mechanical uniformity and increased gas flux may be obtained. In the instance of polypropylene, melt spinning is performed at a temperature in the range of from about 175° C. to about 250° C., preferably from about 190° C. to about 230° C. Polyethylene may be melt spun at a temperature of from about 150° C. to about 250° C., preferably from about 175° C. to about 220° C.

When a fluid injection (e.g., air injection) hollow fiber spinneret is employed, the capillary diameter, fluid flow rate, take-up speed, extrusion velocity, and drawdown ratio are controlled in a manner sufficient to achieve a hollow precursor fiber which will result in a porous hollow fiber having an average inner diameter and average wall thickness with dimensions as described hereinafter. The precursor fiber will also possess a degree of orientation of not greater than about 25° as determined from the half width of a wide angle (110) X-ray diffraction arc.

The degree of fiber molecular orientation is determined by superimposing the fibers in alignment to a thickness of 50 mg/cm$^2$. The fibers are then irradiated with X-rays in a direction perpendicular to the axial direction of the fibers and the half-width of a wide angle (110) diffraction arc is recorded on film. The angular spread of this (110) diffraction arc is then determined and should not be greater than 25°.

The dimensions (i.e., inner and outer diameters and wall thickness) of the hollow precursor fibers produced can be controlled in several ways. Initially, the diameter of the capillary and inert gas pressure selected will govern the inner and outer dimensions, respectively, of the precursor fibers, as modified by the degree of enlargement of fiber dimensions by release from the metered pressure of extrusion through the spinneret (i.e., die swell). Diameter and wall thickness can also be varied by varying the pressure of extrusion through the spinneret and the take-up speed at which the precursor fiber is drawn away from the spinneret. Changes in one of these values can be compensated for by changes in the other to achieve the desired results.

The melt spinning or melt extrusion step of the process is conducted at a relatively high "draw-down" or "spin draw" ratio so that the hollow fibers are spin-oriented as they are formed. Drawdown ratio is defined as the ratio of the velocity of initial take-up speed of the hollow fibers to the linear velocity of extrusion of the polymer through the spinneret orifice. The drawdown ratio used in the process of the present invention is at least 10, preferably at least 25, (e.g., from about 25 to about 400) and may be as high as about 700. Take-up speeds employed to accomplish the requisite drawdown ratios are generally at least about 30 meters/minute, typically from about 50 to about 1000 meters/minute and preferably about 50 to 500 meters/minute. Typically high shear forces are developed in the polymeric material which are not relaxed prior to fiber solidification.

The fluid flow rate i.e., the rate at which the fluid (e.g., air) is passed through the needle in the central portion of the capillary will vary depending on the number of capillaries in the spinneret, wind-up speed, desired diameter and extrusion temperature.

In accordance with a further aspect of the present invention, the hollow fiber precursor is symmetrically quenched by passing it through a substantially symmetrical current of quenching medium, such as ordinary air at room temperature, nitrogen, other gases, various organic and aqueous liquids, gasliquid mixture, so that rapid cooling of the just-spun hollow fiber results. Preferably, the quenching medium comprises air. The temperature of the quenching medium can be as high as about 100° C. and as low as about −40° C. depending on other spinning parameters. Preferably the quench temperature is from about 15° to about 35° C. (e.g. room temperature) and passage of the just-spun fibers through the symmetrical quench of the present invention results in an adequate quench when the take-up roll is located about 10 cm. or greater from the spinneret.

As used herein the term "substantially symmetrically quenched" or "substantially symmetrical flow" means that the quench medium is directed at the just-spun hollow fiber over a full 360° arc. The quench medium may be directed in a radially perpendicular direction to the fiber, or at an angle with respect to the longitudinal axis of the fiber, for example a 45° angle or other convenient angle, provided the quench medium is directed at the fiber over a full 360° arc.

The substantially symmetrical flow of the quenching medium may be obtained by passing the as spun hollow fiber precursor through a hollow annular structure which is connected to a source of the quenching medium. The internal surface of the annular structure is provided with one or more encircling slits or a plurality of openings which direct the quenching medium substantially symmetrically or uniformly against the surface of the hollow fiber precursor.

Various rates of quenching can be obtained by appropriately selecting the specific quenching medium, the temperature of the quenching medium, the pressure of the source of the medium (which can range from about 1 to about 100 psig), the number and arrangement of the openings and the distance from the openings to the hollow fiber precursor (which can range from about 0.1 to about 5 cm). By adjusting these parameters, the porosity of the microporous hollow fiber product can be selected to suit a particular end use.

A further important aspect of the present invention is the location of the symmetrical quenching means in relation to the spinning means. Unlike the preparation of microporous film wherein only the wall thickness is decreased between the as extruded and cooled film, the preparation of porous hollow fiber entails a decrease in both wall thickness and inner diameter. Since the molten hollow precursor can undergo only so much stretching once cooled, proper location of the symmetrical quenching means is necessary for best results. Generally the symmetrical quenching means is located at a distance D of from about 1 to about 12 cm above the die.

In one embodiment of the present invention, for example, polypropylene may be melt spun at temperature of about 215° C. at a rate of about 2.11 gms/min./filament using a spinneret having an effective capillary outer diameter of 4.75 mm oriented in a substantially vertically upward direction. Located about 5 cm above the spinneret is an annular quenching ring having an inner diameter of about 1 cm. The ring is connected to a source of air at 25° C. and a pressure of about 10–30 psig. The inner surface of the ring is spaced 0.5 cm from the as spun hollow precursor fiber and is provided with 1–3 rows of openings, each having about 10–40 openings of about 0.3 mm, symmetrically facing the hollow precursor fiber. Spin orientation of the hollow precursor fiber is accomplished at a take-up speed of about 100–200 m/min.

A further understanding of the present invention may be obtained by reference to FIG. 1. As may be seen therefrom, FIG. 1 illustrates a spinneret arrangement containing six capillaries which are oriented in a substantially vertically upward direction. For convenience, all reference numerals on FIG. 1 will be with respect to a single capillary. Capillary 101 melt spins the polyolefinic material which, after exhibiting die swell 102, is drawn down and is passed through a hollow annular structure 103. Each structure 103 is connected via a conduit 104 to a manifold 105 which is connected to a source of quenching air (not shown). On the inner surface 106 of each of the annular structures 103 are a series of openings which symmetrically direct a flow of quenching air against the hollow fiber precursor. The quenched hollow fiber precursors are then passed to a stretching operation (not shown) wherein the porosity of the microporous hollow fiber is developed.

The hollow precursor fiber resulting from the abovedescribed upspinning/symmetrical quenching sequence is non-porous and exhibits a crystallinity of at least 30%, preferably at least 40%, and most preferably at least 50% (e.g., about 50 to about 60% or more). Percent crystallinity is determined from the relationship:

$$\% \text{ Crystallinity} = \frac{\overline{V_a} - \overline{V}}{\overline{V_a} - \overline{V_c}} \times 100$$

wherein $\overline{V_a}$ is the specific volume of the 100% amorphous polymer, $\overline{V_c}$ is a specific volume of the 100% crystalline polymer and $\overline{V}$ is the specific volume of the sample of interest. The specific volume of a polymer is 1/D where D is the density of the polymer. The density of the polymer is measured by means of a density gradient column as described in ASTM D-1505-68. The hollow precursor fiber should also exhibit an elastic recovery at zero recovery time when subjected to a standard strain (extension) of 50% at 25° C., and 65% relative humidity, of at least about 50%, preferably at least about 60%, and most preferably at least about 65%.

Elastic recovery as used herein is a measure of the ability of structured or shaped articles, such as hollow fibers, to return to their original size after being stretched.

The elastic recovery value is determined with an Instron Tensile Tester operating at a strain rate of 100%/minute. After the fiber is extended to the desired strain value, the jaws of the apparatus are reversed at the same speed until the distance between them is the same as at the start of the test, i.e. the original gauge length. The jaws are again immediately reversed, and are stopped as soon as the stress begins to increase from the zero point. The elastic recovery is then calculated as follows:

$$\text{Elastic Recovery} = \frac{\text{Total Length When Extended} - \text{Final Distance Between Jaws}}{\text{Length Added When Extended}} \times 100$$

Measurements with the Instron Tensile Tester are conducted at room temperature, e.g., 25° C., in air at 65 percent relative humidity.

Although a standard strain of 50% is used to identify the elastic properties of the precursor fibers, such strain is merely exemplary. In general, such precursor fibers will have elastic recoveries higher at strains less than 50% and somewhat lower at strains substantially higher than 50%, as compared to their elastic recovery at a 50% strain.

The above processing conditions are controlled to provide hollow precursor fibers having an average inner diameter (I.D.) of at least 5 microns, preferably from about 5 to about 1500 microns or higher, and most preferably from about 70–1500 microns; and an average fiber wall thickness of from about 1 to 100 microns and preferably from about 10 to 100 microns.

The dimensions of the hollow precursor fibers are expressed as an average value since such dimensions will vary to some extent depending on where, along the fiber length, the dimensions are determined. Consequently, the average inner and outer diameters are determined by cutting cross sections of the fiber at 6 inch intervals for a total of 5 intervals along the fiber length and determining the fiber dimensions at each of these intervals. The fiber sections are then immersed in standard optical immersion oil and the dimension at each interval is determined using an optical microscope and optical scaling. The results are then averaged to determine the average inner and outer diameters.

The minimum wall thickness of the hollow precursor fiber should be sufficient so as to not be readily ruptured or otherwise undergo physical deterioration at a rate that would make their use unattractive after they have been rendered microporous by the procedures to be described below. The maximum wall thickness of the hollow precursor fibers is limited by the degree of permeability sought to be imparted to the final product.

The measurement of average wall thickness is accomplished by determining the average outer diameter and average inner diameter of the fiber as previously described and taking as the wall thickness one half of the difference in these average diameters. More preferably, the wall thickness may be measured directly by computer optical image analysis.

Furthermore, the average wall thickness may be expressed as a function of the average inner diameter of the hollow precursor fiber. The ratio of the average inner diameter of the hollow precursor fiber to its average wall thickness can vary from about 1:10 to about 100:1 and preferably from about 10:1 to about 100:1. An average precursor fiber wall thickness of at least 10 microns and typically from about 10 to about 100 microns is preferred.

In addition to the up-spinning technique, the temperature of spinning and the symmetrical quench of the present invention, the resin characteristics, quench location, extrusion speed and the wall thickness of the final microporous hollow fiber product are believed to be factors affecting gas permeability.

Following spinning and quenching, the hollow precursor fiber is stretched and then heat-set to complete the microporous hollow fiber. Preferably, the hollow precursor fiber is also annealed prior to stretching. Due to the greater molecular orientation of the precursor fibers produced by the process of this invention, annealing is not necessary to the development of the desired microporous structure. Further improvements in porosity and gas transmission rate, however, are obtained thereby, and accordingly in the preferred embodiment the precursor fibers are annealed prior to stretching.

While any of the various annealing, stretching and heat-setting procedures conventionally used in the art may be employed for this purpose, the quenched hollow precursor fiber is preferably processed in accordance with the aforementioned commonly assigned U.S. patent application Ser. No. 11,740. As set forth therein, the quenched hollow precursor fibers are subjected to a heat treatment or annealing step in which the amount of crystallinity and/or the crystal structure is improved. More specifically, this step of the process increases crystallite size and removes imperfections in the molecular alignment. The annealing is conducted for a balance of time and temperature so as to achieve the desired improvements as described above and yet sufficient to avoid destroying or adversely affecting the precursor polymer structure (e.g., orientation and/or crystallinity). Generally, annealing is conducted at a temperature of from 5° to 100° C. below the crystalline melting point of the polyolefinic resin for a period of at least about 0.5 seconds.

The preferred annealing temperatures can vary from about 130° to about 145° C., for a period of about 30 minutes. As the annealing temperature is increased above about 145° C., the time during which the precursor fiber is annealed is accordingly reduced. Conversely, as the annealing temperature decreases below 130° C., increasingly longer annealing times are employed.

If the annealing temperature increasingly exceeds 145° C. at an annealing time of 30 minutes, the precursor polymer fiber structure will be adversely affected and the gas permeability potential of the precursor fiber will be increasingly reduced. If the annealing temperature is increasingly less than 130° C. for 30 minutes, the gas permeability potential of the fiber precursor will also be increasingly reduced.

In view of the above, the annealing is conducted for periods of about 0.5 second to about 24 hours at a temperature of from about 50° C. to less than the melting point of the polymeric material (e.g., 165° C. melting point for isotactic polypropylene based on differential scanning calorimetry).

The annealing step may be conducted in a tensioned or tensionless state by depositing the fiber precursor in a static condition in a heating zone which is maintained at the requisite elevated temperature, or by continuously passing the precursor fiber through the heating zone. For example, the elevated temperature may be accomplished by the use of a conventional circulating air oven, infra-red heating, dielectric heating, or by direct contact of the running fiber with a heated surface which is preferably curved to promote good contact. The precursor fiber may be continuously passed through a jacketed tube or shroud which radiates heat at the desired temperature. Alternatively, the fiber precursor may be wound under substantially no stress on a bobbin while undergoing annealing, or may be simply placed in the heating zone in a loose state, such as a skein of continuous fibers. For best results it is recommended that the hollow fiber be maintained at constant length during the annealing step, i.e., under tension sufficient to prevent a longitudinal extension or shrinkage of greater than about 5%. This can be achieved by passing the fibers in the direction of their length over and about a first stress isolation device through a heating zone maintained at the appropriate temperature and then over and about a second stress isolation device. Each stress isolation device may conveniently take the form of a pair of skewed rolls. Control of the ratio of the surface speeds of the two sets of rolls permits isolation and control of the stress of the fibers between the rolls as they undergo annealing.

The resulting non-porous precursor hollow fiber is then subjected to a stretching operation, preferably a cold stretch, hot stretch two-stage stretching process, and subsequently heat set.

In the first stretching stage referred to herein as cold stretching, the hollow precursor fiber is stretched at a temperature above the glass transition temperature (Tg) of the precursor fiber and generally not greater than about 100° C. Typical cold stretching temperatures for polypropylene can vary from about 0° to about 100° C., preferably from about 15° to about 70° C., and conveniently at room temperature. e.g., 25° C. The cold stretching temperatures for other polyolefins will be similar to those employed for polypropylene, e.g., about room temperature. The temperature of the fiber itself is referred to as the stretch temperature.

It is recognized by those skilled in polymer technology that the glass transition temperature (Tg) is the temperature at which the structure of a wholly or partially amorphous polymeric material changes from a vitreous state to a viscoelastic state. The glass transition temperature of the polymeric material is measured by plotting its specific heat against temperature and noting the temperature at which there is a a change in the slope of the curve. This measurement is commonly termed thermomechanical analysis and can be carried out with commercially available instruments such as a Thermomechanical Analyzer Model No. 990 manufactured by Du Pont. The glass transition temperature is also referred to as the second-order transition temperature.

Cold stretching imparts porous surface regions or areas to the fiber wall which are elongated perpendicular to the stretch direction.

The second stretching stage, referred to herein as hot stretching, is conducted at a temperature above the cold stretching temperature but less than the melting point of the precursor fiber before or after cold stretching, i.e., the first-order transition temperature, as deterined by differential scanning calorimeter analysis.

Typical hot stretching temperatures for polypropylene will be greater than about 100° C. and can vary from about 105° to about 145° C., preferably from about 130° to about 145° C., and most preferably from about 135° to about 145° C. Again the temperature of the fiber itself being stretched is referred to herein as the hot stretch temperature. The hot stretching temperature will vary somewhat from the foregoing values for other polyolefins, but will generally be greater than the cold stretching temperature and less than the melting point of the precursor fiber.

Hot stretching opens the structure imparted by cold stretching to form an open celled microporous structure.

The stretching in the two stretching stages must be consecutive, in the same direction and in that order, i.e., cold stretched and then hot stretched, but may be done in continuous, semi-continuous, or a batch process as long as the cold stretched fiber is not allowed to shrink to any significant degree (e.g., not greater than about 10% based on the initial precursor fiber length).

The sum total degree of stretching in the above cold and hot stretching stages can vary from about 80 to about 200% (e.g., about 80 to about 155%), and preferably from about 85 to about 120% (e.g., about 90%), based on the initial length of the precursor fibers. When the total degree of stretch is increasingly less than about 80%, the resulting oxygen flux gas permeability at 10 psi is increasingly less than about 30 cc/cm$^2$. min. depending on the resin characteristics. The ratio of the degree of stretch of the first (cold) to second (hot) stretching stages, is referred to herein as the extension ratio. The extension ratio can vary from about 20:1 to about 1:20, and will preferably be from about 1:3 to about 1:20.

It is to be understood that the particular total degree of stretch and extension ratio are selected from the above ranges in a manner sufficient to control the final average inner diameter of the hot stretched microporous fibers within the limits described herein. Gas permeability may also be controlled to a desired level by choice of stretching conditions.

The strain rate, i.e., the degree of stretch per unit time, at which the precursor fibers are stretched during both stretching stages is preferably the same for each stage and can vary from about 10 to about 200%/minute, preferably from about 10 to about 100%/minute and most preferably from about 15 to about 30%/minute (e.g., about 20%/minute).

The cold and hot stretching of the precursor fibers may be performed in any convenient manner using known techniques. For example, the hollow precursor fibers can be stretched on a conventional draw frame located in a heating zone which controls the temperature of the fibers during stretching. Alternatively the fibers may be cold and hot stretched in a continuous fashion by means of two sets of stress isolation devices (one set for each stage) similar to those described in connection with the annealing step. For example, precursor fibers may be wound several times about a first pair of skewed rolls, passed through a heating zone, wherein for example they are contacted with a suitable heating device or medium and maintained at a suitable cold stretch temperature and wound several times about a second pair of skewed rolls. This arrangement permits isolation and control of the longitudinal stress of the fibers between the two pairs of rolls during cold stretching. The fibers are then passed through a similar set of paired skewed rolls while heated to the appropriate hot stretch temperature. The differential ratio of the surface speed of each of the second pair of rolls to the surface speed of each of the first pair of rolls determines the stretch ratio and strain rate which are adjusted accordingly.

It is to be understood that in a continuous process the cold stretched fibers may undergo shrinkage as they pass from the cold stretching stage to the hot stretching stage. This can occur as a result of warm-up of the cold stretched fibers as they enter the hot stretching zone, such as a forced hot air oven, but before they are actually hot stretched. Consequently, it is preferred to insert a tensioning device between the cold and hot stretching stages to prevent shrinkage of greater than about 5% based on the cold stretched fiber length. Such tensioning device may conveniently take the form of a single pair of skewed rolls.

The heating zones which heat the precursor fibers to the appropriate cold stretch and hot stretch temperatures are the same as described for the annealing step and may conveniently take the form of a gas such as air, heated plate, heated liquid and the like. The preferred heating device is a forced hot air oven which houses the stretching means.

After the above described cold and hot stretching operations, the stretched fibers are heat set while in the stretched condition at a temperature of from about 125° C. up to less than the fusion temperature of the polyolefinic material (e.g., from about 130° to about 160° C. for polypropylene). As is known to those skilled in the art, the fusion temperature may be determined by a standard differential scanning calorimeter or by other known apparatus which can detect thermal transitions of a polymer. For polypropylene, the preferred heat setting temperatures can vary from about 130° to about 145° C. The most preferred heat setting temperature is the same as the temperature employed during hot stretching. Heat setting does not change the fiber diameters appreciably as they exist subsequent to hot stretching.

The heat setting step may be conducted in a batch process as in an oven or autoclave, or in a continuous manner. For instance, the hollow microporous fibers may be rewound on a bobbin after hot stretching, and subjected to the heat setting operation in that form. Alternatively, the hollow fibers may be stretched and heat set in a continuous procedure by means of two pairs of driven rolls downstream to the stretching rolls travelling at the same speeds with the material between the rolls continuously passing at constant length through the heating zone. Consequently, the stretching and heat setting steps of the process may be carried out sequentially or they may be combined in a single in line operation.

The heat setting treatment should be carried out while the fibers are being held under tension, i.e., such that the fibers are not free to shrink or can shrink only to a controlled extent of not greater than about 50% of their stretched length. In other words, the heat setting treatment should be conducted under conditions such that the fibers are hot relaxed no more than 50% of their stretched length.

The period of heat setting treatment which is preferably carried out sequentially with and after the hot stretching operation, should not be longer than 0.1 second at the higher heat setting temperatures and, in general, may be within the range of about 5 seconds to 1 hour and preferably about 1 to 30 minutes.

Since the most preferred heat set temperature is the same as the hot stretching temperature, it is preferred to conduct both hot stretching and heat setting in the same heating means, such as a hot air oven, in which case the total residence time in the oven for hot stretching and heat setting steps can vary from about 10 to about 45 minutes, and preferably from about 25 to about 35 minutes (e.g., 35 minutes) for hot stretching temperatures of about 130° to about 145° C.

The function of the heat setting step is to improve the dimensional stability of the microporous structure and reduce shrinkage of the fibers.

In an alternative embodiment, the hot stretching and heat setting steps may be combined into a single step.

In this embodiment hot stretching is achieved using a plurality of discrete sequential hot stretching operations at the appropriate hot stretch temperature. For example, after the fibers have been cold stretched they are guided into a means capable of stretching the fibers in an incremental fashion while maintained at the appropriate hot stretch temperature so that the total degree of stretch of each increment adds up to the desired degree of total hot stretch.

The multiple stage hot stretching means may conveniently take the form of a plurality of rolls disposed in an oven. Preferably the rolls are disposed in a festoon configuration similar to that described in U.S. Pat. No. 3,843,761, the disclosure of which is herein incorporated by reference. The employment of a festoon arrangement is preferred in that it provides extended exposure time in the oven containing the multiple stage hot stretching means and thereby eliminates the need for any heat setting step after hot stretching is concluded.

Figure 2:
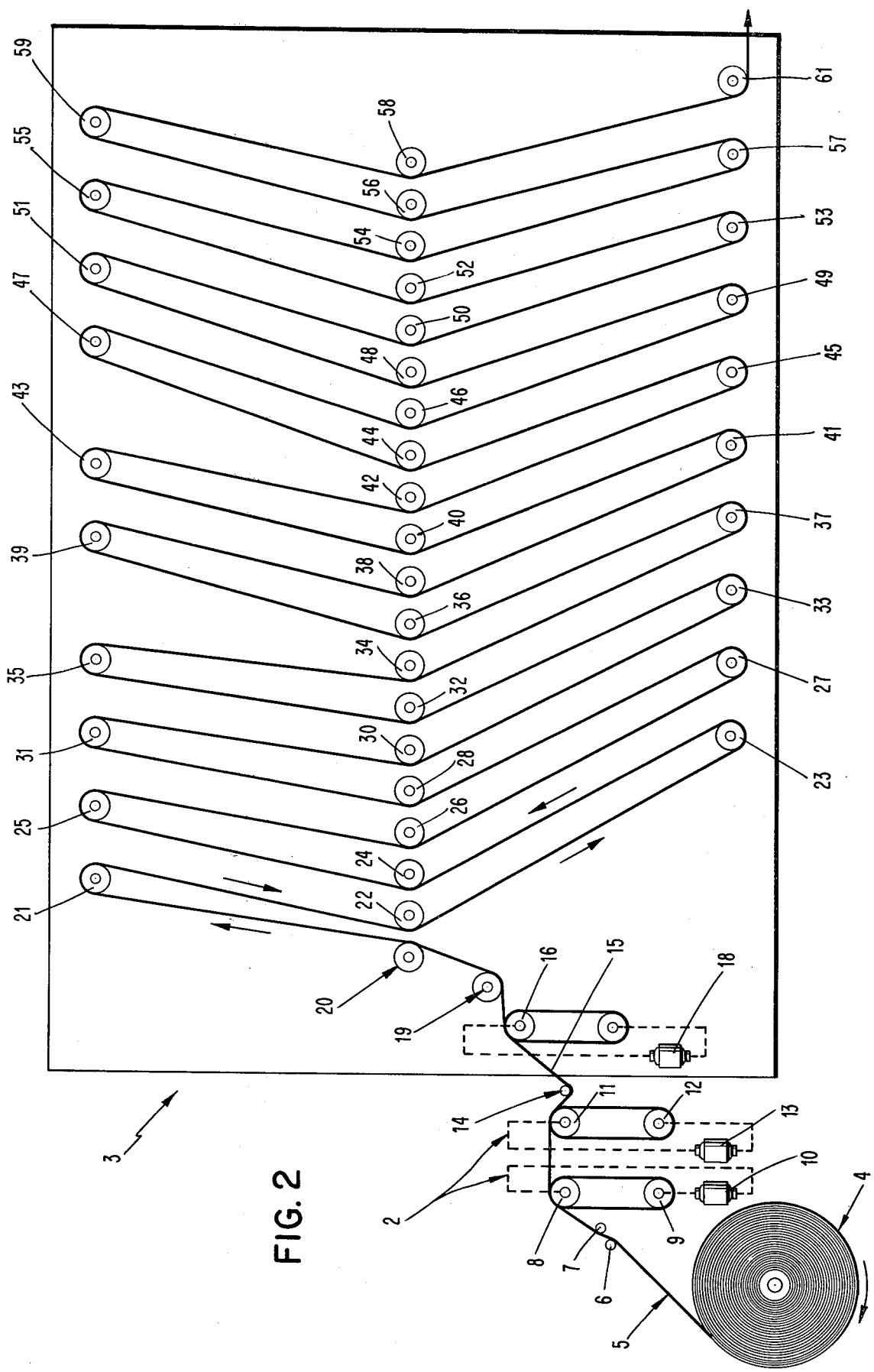
FIG. 2 is a schematic representation of a means for achieving hot stretching in multiple stages.

To illustrate a preferred method for achieving multiple stage hot stretching and combined heat setting, reference is made to FIG. 2. Non-porous precursor fibers 5 which have been annealed are unrolled from a supply roll 4, over idler rolls 6 and 7 into a cold stretching zone generally denoted at 2. The cold stretching apparatus includes two pairs of skewed rolls 8–9 and 11–12 which are driven at peripheral speeds $S_1$, $S_2$, $S_3$ and $S_4$, respectively, by suitable driving means 10 and 13 to achieve the desired degree of cold stretch as described herein. For purposes of illustration the cold stretch temperature is at room temperature and no heating or cooling means is required for this stage. If desired, however, suitable temperature control means may be supplied as described herein. The cold stretched fibers, now denoted 15, are guided into hot stretching means generally indicated at 3 over one or more idler rolls 14. Nip rolls are not employed since they tend to crush the hollow fibers which is disadvantageous to the final product. The hot stretching means 3 comprise a single set of skewed rolls 16 and 17 and a plurality of additional multiple hot stretching rolls disposed in an oven in a festoon configuration. In order to minimize the unsupported fiber length between adjoining hot stretch rolls, which is relatively long in the preferred festoon arrangement, at least one idler roll is provided between adjoining hot stretch rolls.

The single set of skewed rolls 16 and 17 helps to maintain tensioning of the cold stretched fibers by controlling the peripheral speeds $S_5$ and $S_6$ respectively thereof. Tensioning prevents shrinkage, sag and the like caused by any preheating of the fibers as they pass into the oven but before they are hot stretched. Such tensioning helps to avoid any decrease in cold stretched fiber properties caused by preheating. Although this tensioning step, to prevent fiber relaxation, may result in a small amount of stretching, the primary effect of this procedure is tensioning and the peripheral speeds $S_5$ and $S_6$ are controlled accordingly by drive means 18 to maintain constant length between cold stretching and hot stretching zones. Thus this procedure is but a preferred embodiment of a means for maintaining fiber tension prior to hot stretching. Other methods that prevent fiber relaxation during warm-up of the fibers prior to hot stretching may be employed.

The tensioned cold stretched fibers 15 are then conveyed downstream over idler rolls 19 and 20 onto a first hot stretch roll 21. The fibers are hot stretched for the first time between roll 21 and the second tensioning roll 16. This occurs because the downstream first hot stretch roll 21 is rotated at a peripheral speed $S_7$ which exceeds the peripheral speed $S_5$ imparted to the fibers by roll 16. It should be noted than an idler roll 19 is disposed between rolls 16 and 21 in order to decrease the unsupported fiber length during the hot stretching step.

This procedure is continued for as many discrete steps as may be preferred. For example, the fibers are stretched for a second time between the first hot stretch roll 21 and a second hot stretch roll 23. In this second hot stretch step, the peripheral speed of the second hot stretch roll 23 is $S_8$. Peripheral speed $S_8$ is greater than the peripheral speed $S_7$ of the first hot stretch roll 21. Thus, the fibers are hot stretched in the second hot stretch step at a hot stretch ratio of $S_8/S_7$. Again, in order to minimize the unsupported fiber length at least one idler roll 24 is disposed between the second and third hot stretch rolls 23 and 25. In a preferred embodiment, illustrated in FIG. 2, the idler rolls are disposed approximately midway between adjoining hot stretch rolls.

In the embodiment illustrated in FIG. 2, twenty stretching steps, which occur sequentially, are provided. As further illustrated in FIG. 2, in order to provide twenty stretching steps, twenty-one hot stretch rolls are required. It should be noted that the second tensioning roll 16 is equivalent to the first hot stretching roll. In general, in the hot stretching apparatus of the preferred embodiment, (n+1) hot stretch rolls are required to provide n sequential hot stretch steps. Preferably 2 to 40 stretching steps are preferred in the multiple stage hot stretching operation.

Two preferred methods may be employed to provide continuously increasing peripheral speed with each additional downstream hot stretch roll. In one preferred embodiment, all the rolls are driven by one common drive mechanism. Thus, each hot stretch roll is driven at the same rotational speed. However, each hot stretch roll is of different diameter. More specifically, each additional downstream hot stretch roll has a greater diameter than the upstream roll adjacent to it. Thus, roll 23 is of greater diameter than roll 21 and roll 57, the downstream most hot stretch roll has a diameter greater than the diameter of the next to last downstream roll 55. As those skilled in the art are aware, the peripheral or surface speed of a larger diameter roll rotating at its center at the same speed as a roll of smaller diameter is greater than the smaller roll. Therefore, the employment of increasingly greater diameter rolls serves the purpose of providing differential peripheral speeds between adjoining hot stretch rolls.

A second preferred method for providing a differential increasing peripheral speed between adjoining hot stretch rolls is to provide separate driving means for each roll. In this preferred embodiment, each roll may be of the same diameter. The increasing speed of adjoining downstream hot stretch rolls then becomes a function of the power imparted to each roll.

It will be understood that the process variables described above in connection with the single increment hot stretching procedure are applicable to the multistage hot stretching operation with the exception that obvious modifications may be necessary in going from the former to the latter. For example, as described above, the total degree of hot stretch in both stretching embodiments is the same with the exception that in multiple stage hot stretching the total degree of stretch is achieved in several, preferably equal, increments. Also, the strain rate for each hot stretching increment is preferably controlled to provide a total residence time in the multiple hot stretching zone approximately equal to the combined residence time for heat setting employed in connection with single increment hot stretching and that obtained when the strain rate is within the ranges described herein for hot stretching in a single stage.

The finished microporous hollow fiber produced in accordance with the present invention possesses an average inner diameter in the range of from about 5 to about 1500 microns and preferably in the range of from about 70 to about 1500 microns. As been described above with respect to the average inner and outer diameter of the hollow precursor fiber, for the purposes of the present invention the average inner diameter of the finished microporous hollow fiber is determined by cutting cross sections of the fiber at 6 inch intervals for a total of 5 intervals along the fiber length and determining the fiber dimension at each of these intervals. The measurements obtained for each of the 5 intervals are then averaged to produce the average inner diameter of the finished microporous hollow fiber.

A unique feature of the instant microporous polyolefinic fibers is their substantially uniform inner diameter (I.D.). Microporous hollow fibers in accordance with the present invention have a coefficient of variation in inner diameter through a cross section taken perpendicular to the axis of the fiber of less than about 8%, preferably less than about 5% and most preferably less than about 3%. For the purposes of the instant invention, the variation in inner diameter is determined by measuring the maximum and minimum inner diameters for each of the five fiber intervals, calculating a standard deviation for the inner diameter, and then calculating the coefficient of variation in inner diameter (I.D.) according to the equation:

$$\% \text{ Coefficient of Variation} = \frac{\text{Sigma } I.D.}{\text{Mean } I.D.} \times 100$$

wherein Sigma I.D. is the standard deviation in the inner diameter and Mean I.D. is the mean inner diameter of the fiber sample.

The average wall thickness of the microporous polyolefinic hollow fibers in accordance with the present invention will generally comprise from about 1 to about 75 microns, and preferably from about 15 to about 30 microns. The measurement of the average wall thickness may be accomplished by determining the average outer diameter and average inner diameter of the fiber as previously described and taking as the wall thickness one half of the difference in these average diameters.

More preferably, the average wall thickness is determined by directly measuring the wall thickness at 90° arcs about the circumference (yielding four wall thickness measurements) at each of five 6 inch intervals along a fiber sample (yielding 20 wall thickness measurements) by computer optical image analysis, and then averaging the measured values to obtain an average wall thickness value.

As a result of the improved processing techniques provided by the instant invention, the wall thickness through a cross-section taken perpendicular to the axis of the instant microporous hollow fibers has a coefficient of variation of less than 20%, preferably less than 10%, and most preferably less than about 7%. The coefficient of variation in wall thickness is determined by measuring the wall thickness at 90° arcs about the circumference at each of five 6 inch intervals along a fiber sample by computer optical image analysis as discussed above, calculating a standard deviation for the wall thickness, and then calculating the coefficient of variation in wall thickness according to the following equation:

$$\% \text{ Coefficient of Variation} = \frac{\text{Sigma } W.T.}{\text{Mean } W.T.} \times 100$$

wherein Sigma W.T. is the standard deviation in wall thickness of the fiber sample and Mean W.T. is the mean wall thickness of the sample. As a result of the substantially uniform wall thickness of the microporous polyolefinic hollow fibers of the instant invention, the present microporous hollow fibers exhibit a reduced tendency to break or split at weak points in the fiber wall which were inherent in the microporous hollow fibers of the prior art due to their greater variation in wall thickness.

The pores of the microporous hollow fibers are essentially interconnected through tortuous paths which may extend from one exterior surface or surface region to another, i.e., open-celled. This term "open-celled structure" signifies that the major portion of the void or pore space within the geometric confines of the walls of the hollow fiber is accessible to the surfaces of the fiber walls.

Further, the pores of the microporous hollow fibers of the present invention are microscopic, i.e., the details of the pore configuration or arrangement are described only in terms of microscopic dimensions. In fact, the open cells or pores in the fibers are smaller than those which can be measured using an ordinary light microscope, because the wavelength of visible light, which is about 5,000 Angstroms (an Angstrom is one ten-billionth of a meter), is longer than the longest planar or surface dimension of the open cell or pore. The pore size of the microporous hollow fibers of the present invention may be identified, however, by using electron microscopy techniques which are capable of resolving details of pore structure below 5,000 Angstroms or by mercury intrusion techniques.

The open-celled microporous hollow fibers prepared in accordance with the present invention have an average effective pore size of 50 to 2000 Angstroms, and more usually 100 to 1000 Angstroms. The pores of the present microporous hollow fibers have an elongated shape with a width of from 50–2000 Angstroms and a length of from 500 to 10,000 Angstroms. These values are determined by taking an electron micrograph of the fibers, determining pore length and width measurements by using an image analyzer or ruler to directly measure the length and width of the pores, usually at 5,000 to 12,000 magnification, and then scaling down to appropriate size.

Figure 3:
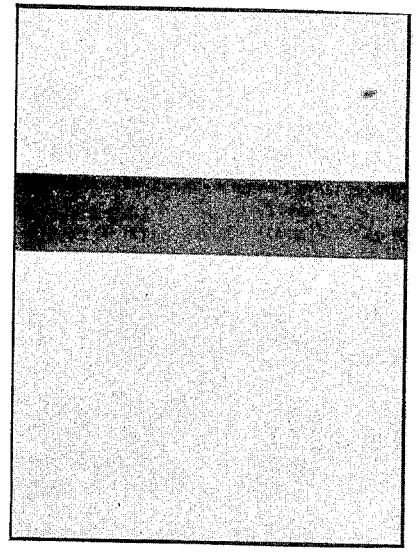
FIG. 3 is a photomicrograph at a magnification of 46.5× of the wall of a microporous polypropylene hollow fiber produced in accordance with the present invention wherein the axis of the fiber runs from left to right.

A further significant characteristic of the microporous hollow fibers of this invention which results from the upspinning/symmetrical quenching technique used in their manufacture is that the present microporous hollow fibers possess a substantially uniform porosity around the circumference of the fiber. Porous regions of the fiber wall appear as dark regions in photomicrographs whereas non-porous regions appear as light regions in photomicrographs. A photomicrograph of a typical microporous hollow fiber produced via the cross flow quench technique of the prior art (FIG. 4), for example, exhibits broad light bands corresponding to the non-porous areas of the fiber. Such non-porous areas result from the inadequate quenching of the side of the precursor fibers not in direct contact with the quenching gas. In contrast, as shown by FIG. 3, microporous hollow fibers produced using a substantially symmetrical quenching appear uniformly dark in photomicrographs as a result of the greatly improved uniformity in the porosity of the fiber.

In addition to the aforementioned photomicrographic evidence of the substantially uniform porosity of the present microporous hollow fibers, the instant microporous hollow fibers also exhibit a substantially uniform x-ray diffraction pattern, crystallinity and surface area about the circumference of the fiber. As is well known to those skilled in the art, uniformity in such characteristics is indicative of a uniformity in fiber porosity.

The microporous hollow fibers of this invention also exhibit a substantially uniform pore density about the circumference the fibers, which is a direct indication of the uniformity of the porosity of the fibers. Microporous hollow fibers in accordance with the present invention exhibit an average ratio of the maximum pore density to the minimum pore density around the circumference of the fiber of less than about 3:1, and preferably less than about 2:1. For the purposes of the present invention, this ratio is calculated by measuring the maximum and minimum pore density (based on a 625 square micron section of the fiber wall) around the circumference of the fiber at each of five six inch intervals along the fiber sample; dividing the maximum pore density of each interval by the minimum pore density of each interval; and then averaging the results for each of the five intervals to produce an average ratio of maximum pore density to minimum pore density for the fiber sample.

The substantial uniformity of porosity and wall thickness of the microporous hollow fibers of this invention enables an improved transfer rate to be obtained as characterized by an oxygen flux of at least about 10, preferably in the range of from about 30 to about 300 and most preferably in the range of from about 100 to about 300 cc/cm$^2$.min at 10 psig. In applications where oxygen flux and porosity are not as important, the oxygen flux may be as low as 1 cc/cm$^2$.min at 10 psig.

The oxygen flux $J_g$ is determined by passing oxygen gas through a hollow fiber module such as that described in U.S. Pat. No. 4,055,616, which is herein incorporated by reference. The hollow fiber module permits gas to be passed under pressure (e.g., 10 psi) through the interior of the hollow fibers, through the microporous hollow fiber wall and collected. The volume of the gas collected over a period of time is then used to calculate the gas flux in cc/cm$^2$.min of the hollow fibers according to the equation:

$$J_g = \frac{V}{(A)(T)}$$

wherein V is the volume of gas collected; A is the internal surface area of the hollow fibers determined from the equation A=n$\pi$dl wherein n is the number of hollow fibers, d is the inner diameter of the hollow fibers in centimeters, and l is the fiber length in centimeters; and T is the time in minutes it takes to collect the gas.

The microporous hollow fibers of the present invention in addition to having good gas permeability also exhibit good liquid flux and are suitable for a number of applications including blood oxygenation, ultra filtration, dialysis, separation of gamma globulin from blood, for ascites treatment, as well as a variety of other applications which employ hollow microporous fibers such as gaseous and liquid filtrations. For certain uses it may be desired to render the normally hydrophobic hollow microporous fibers of the present invention hydrophilic. This can be achieved by any means known to those skilled in the art such as by the impregnation of the pores of the fibers with a suitable surfactant such as the high molecular-weight, non-ionic surfactants available under the trade name Pluronics from Wyandotte Chemicals Corp. which are prepared by condensing ethylene oxide with a hydrophobic base formed by the condensation of propylene oxide with propylene glycol. Other surfactants include the series of non-ionic surface-active agents available under the trade name Tween which are polyoxyalkylene derivatives of hexitol anhydride partial long chain fatty acid esters. Alternatively, the fibers may be treated with sulfuric acid, chlorosulfonic acid or other such agents to render the fibers hydrophilic, or grafted with hydrophilic monomers such as acrylic acid.

The invention is additionally illustrated in connection with the following Examples which are to be considered as illustrative of the present invention. It should be understood, however, that the invention is not limited to the specific details of the Examples.

EXAMPLE 1

Polypropylene of 5 melt index was extruded upwardly at 215° C. through an annular orifice of 4.75 mm outer diameter and 3.75 mm inner diameter at a rate of 2.11 gms/min. The tube forming the inner area of the orifice was hollow and air was injected into the lumen of the forming filament at the rate of 3.5 cc/min, as measured at room temperature. A circular quench device encircled the fiber 5 cm above the orifice. This device contained 32 holes of 0.3 mm diameter, all directed so that air forced through the holes would impinge on the filament from all directions. The fiber was quenched with air which was supplied to a plenum behind the holes of the circular quench device at a pressure of 20 psig, and then taken-up at a take-up speed of 100 m/min. by a wind up device. Following annealing at 140° C. for one hour, the resulting precursor fiber was found to have an elastic recovery (E.R.$_{50}$) of 98% and had a cross-section which was essentially round with a 264 micron average I.D. and a 30 micron average wall thickness. The following uniformity characteristics of this precursor were observed:

|  | Average | Range | Coefficient of Variation |
|---|---|---|---|
| I.D., microns | 264 | 255–273 | 2.0% |
| O.D., microns | 325 | 315–335 | 2.0% |
| wall thickness, microns | 30 | 27–33 | 4.0% |
| Max. I.D./Min. I.D. | 1.05 | 1.11–1.0 | |

The annealed fiber was then stretched in a batch fashion 20% at 25° C., then 100% at 140° C., and then allowed to shrink 10% at 140° C. The fiber wall became greater than 40% porous and exhibited an oxygen gas flux of 160 cc/min-cm$^2$ at 10 psig. Mercury porosymmetry measured an average effective pore dimension of 1000 Angstroms. The following uniformity was observed.

|  | Average | Range | Coefficient of Variation |
|---|---|---|---|
| I.D., microns | 251 | 241–262 | 3% |
| O.D., microns | 307 | 295–320 | 3% |
| Wall thickness, microns | 28 | 25–29 | 5.8% |
| Max. I.D./Min. I.D. | 1.08 | 1.1–1.06 | |
| Max. pore density/625μ$^2$ | | 1600 | |
| Min. pore density/625μ$^2$ | | 1300 | |
| Max. pore density/Min. pore density | | 1.23 | |

A photomicrograph of the resulting microporous hollow fiber is shown in FIG. 3. As can be seen therefrom, microporous hollow fibers produced in accordance with this invention are substantially uniform in porosity as evidenced by the uniformly dark appearance of the fiber in the photomicrograph.

COMPARATIVE EXAMPLE 1

Polypropylene of 5 melt index was extruded downwardly at 215° C. through the same orifice as used in Example 1 at 4.22 gms/min. Quenching air was blown across the fiber for a length of 0.75 m after leaving the orifice. The average air velocity was 50 m/min. The fiber was wound up at 200 m/min. After annealing for one hour at 140° C., the fiber had an elastic recovery (E.R. 50) of 95%. The fiber was then stretched in the same manner as Example 1. The resulting microporous hollow fiber had an oxygen gas permeability of 72 cc/min-cm$^2$ at 10 psig. The following uniformity characteristics were observed:

|  | Average | Range | Coefficient of Variation |
|---|---|---|---|
| I.D., microns | 240 | 220–253 | 9.3% |
| O.D., microns | 285 | 255–291 | 10.1% |

-continued

|  | Average | Range | Coefficient of Variation |
|---|---|---|---|
| Wall thickness, microns | 23 | 12–28 | 28% |
| Max. I.D./Min. I.D. | 1.15 | 1.21–1.10 | |
| Max. pore density/625μ$^2$ | 1425 | | |
| Min. pore density/625μ$^2$ | 300 | | |
| Max. pore density/ Min. pore density | 4.75 | | |

Figure 4:
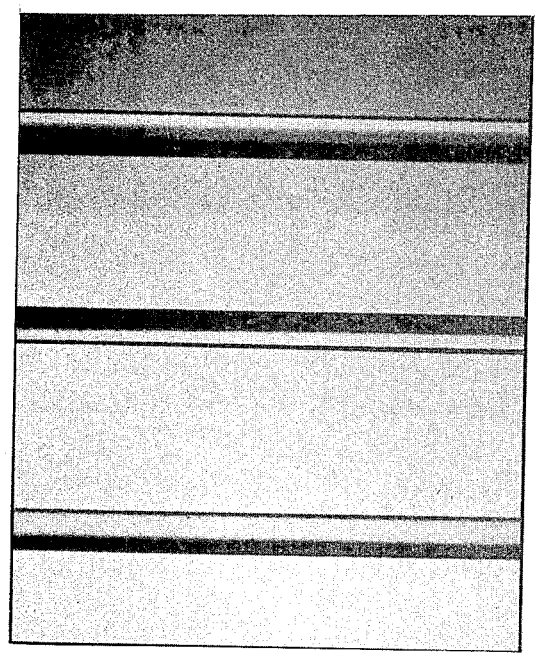
FIG. 4 is a photomicrograph at a magnification of 25× of the wall of three microporous polypropylene hollow fibers produced identically to the manner of the fiber of FIG. 3 except that the fibers were quenched with a cross flow stream of air rather than a substantially symmetric flow of air.

A photomicrograph of the resulting microporous hollow fiber is shown in FIG. 4. As can be seen therefrom, microporous hollow fibers produced using the crossflow quench/down-spinning technique of the prior art possess a non-uniform porosity about the circumference of the fiber as evidenced by the broad light bands appearing in the photomicrograph of these fibers.

EXAMPLE 2

A microporous polypropylene (melt index 5) hollow fiber was prepared by the procedure of Example 1 except that the annealing step was omitted. Microporosity still developed in the fiber, but to a lesser extent than the fiber of Example 1. Oxygen gas flux was 60 cc/min-cm$^2$ at 10 psig.

EXAMPLE 3

The annealed hollow polypropylene precursor fiber of Example 1 was stretched 180% at 25° C., then relaxed 50% of the stretched length at 140° C. The fiber became porous and had an oxygen gas flux of 15 cc/min-cm$^2$ at 10 psig.

EXAMPLE 4

The annealed hollow precursor fiber of Example 1 was drawn continuously over moving rolls at speeds to effect stretching of 17% at 25° C., 70% at 140° C. and then 18% relaxation at 140° C. The resulting polypropylene hollow fiber was porous with an O$_2$ flux of 50 cc/min-cm$^2$ at 10 psig. Shrinkage at 100° C. was less than 2.5%. Mercury porosymmetry measured approximately 35% void fraction and an average effective pore size of 600 Angstroms.

EXAMPLE 5

The annealed polypropylene hollow precursor fiber of Example 1 was drawn continuously as in Example 4 with the exception that stretching was 22% at 25° C., 120% at 140° C., and relaxation was 18% at 140° C. The oxygen gas flux of the resulting microporous hollow fiber was 100 cc/min-cm$^2$ at 10 psig. Shrinkage was less than 2.5%. In addition, the fiber had a void fraction of 45% and an average effective pore size of 700 Angstroms as measured by mercury porosymmetry.

EXAMPLE 6

A series of microporous hollow fibers were prepared by the procedure of Example 1 using isotatic polypropylene resins having melt indexes of 1.2, 4.0, 5.0, 12, 20 and 35 in order to demonstrate the effect of the resin melt index on porosity. After stretching the fibers in the manner set forth in Example 1, the following oxygen gas permeabilities were observed:

| Resin Melt Index | O$_2$ Permeability (cc/min-cm$^2$ at 10 psig) |
|---|---|
| 1.2 | 114 |
| 4.0 | 121 |
| 5.0 | 142 |
| 12 | 125 |
| 20 | 58 |
| 35 | 21 |

EXAMPLE 7

A series of microporous hollow polypropylene (melt index 5) fibers were prepared by the procedure of Example 1, except that the distance from the orifice to the symmetric quenching device was varied. The tension of the spinning threadline was observed to vary with the location of the quench device. Furthermore, when the filaments were annealed and stretched according to the conditions of Example 1, the oxygen permeability was also observed to vary with quench device location. The results of these experiments were as follows.

| Distance From Quench Device to Orifice | Threadline Tension | O$_2$ Permeability (cc/min-cm$^2$ at 10 psig) |
|---|---|---|
| 3.2 cm | 15 gms | 135 |
| 4.4 cm | 12 gms | 145 |
| 7.6 cm | 10 gms | 128 |
| 10.2 cm | 7 gms | 80 |

EXAMPLE 8

Following the procedure of Example 1, a series of hollow polypropylene (melt index 5) precursor fibers having average inner diameters of 115, 400 and 800 microns were prepared by varying the polymer delivery rate, the flow of air to the lumen of the forming filament and the wind-up rate (take-up speed). The specific conditions employed for the preparation of these precursor fibers were as follows:

| Fiber I.D. (microns) | Polymer Feed Rate (grams/min.) | Lumen Air Flow Rate (cc/min.) | Take-up Speed (m/min) | Air Quench Rate (psig) |
|---|---|---|---|---|
| 115 | 1.33 | 1.0 | 135 | 5 |
| 400 | 3.73 | 9.3 | 100 | 30 |
| 800 | 3.53 | 11.5 | 30 | 45 |

The spinneret, spinning direction, spinning temperature, quenching device and quench device location were the same as that of Example 1.

The resulting precursor fibers were then annealed and stretched as in Example 1, and were found to have the following O$_2$ permeabilities:

| Fiber I.D. (microns) | O$_2$ Permeability (cc/min-cm$^2$ at 10 psig) |
|---|---|
| 115 | 110 |
| 400 | 140 |
| 800 | 100 |

EXAMPLE 9

Using the spinneret and quenching device of Example 1, a polyethylene microporous hollow fiber was prepared. A polyethylene resin having a melt index of 5 was extruded in an upward direction at 160° C. at a polymer feed rate of 1.4 grams/min. Air was injected into the lumen of the molten filament at a rate of 1.7 cc/min, as measured at room temperature. The hot filament was symmetrically quenched in the manner of Example 1 with a quench device location of 2.5 cm above the orifice and an 8 psig air flow, and taken-up at a wind-up rate of 46 m/min. After annealing at 105° C. for one hour, the hollow precursor fiber was made microporous by stretching 40% at 25° C., and 100% at 105° C., followed by a heat relaxation of 10% at 105° C. The oxygen gas permeability of the resulting microporous hollow fiber was found to be 105 cc/min-cm² at 10 psig.

EXAMPLE 10

A polymethylpentene microporous hollow fiber was prepared as follows. Using the spinneret and quenching device of Example 1, a polymethylpentene resin having a melt index of 5 was melt spun in an upward direction and symmetrically quenched. The spinning conditions included an extrusion temperature of 285° C., a polymer feed rate of 1.50 grams/min., a lumen air injection rate of 1.8 cc/min and a wind-up rate of 55 m/min. Quenching was accomplished in the manner set forth in Example 1 with a quench device location of 3.2 cm above the orifice and a 4 psig air flow. The resulting hollow precursor fiber was annealed at 180° C. for one hour and then stretched 30% at 25° C., 60% at 180° C. and then heat relaxed 5% at 180° C. The so-treated polymethylpentene hollow fiber was found to be porous and possessed an oxygen gas permeability of 80 cc/min-cm² at 10 psig.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:
1. A microporous polyolefinic hollow fiber having:
 (a) an average wall thickness in the range of from about one micron to about 75 microns;
 (b) a coefficient of variation in wall thickness throughout a cross-section taken perpendicular to the axis of the fiber of less than about 20%;
 (c) an average inner diameter in the range of from about 5 microns to about 1500 microns;
 (d) a coefficient of variation in inner diameter throughout a cross-section taken perpendicular to the axis of the fiber of less than about 8%;
 (e) a substantially uniform porosity across the circumference of said fiber as determined by the average ratio of the minimum pore density to the maximum pore density around the circumference of said fiber of less than about 3:1;
 (f) an oxygen flux of at least 100 cc/cm²-min. at 10 p.s.i.g.; and
 (g) an average pore size as measured by electron micrograph of from about 50 to about 2000 Angstroms in width and from 500 to 10,000 Angstroms in length.
2. The microporous polyolefinic hollow fiber of claims 1, wherein said fiber has a coefficient of variation in wall thickness of less than about 10% and a coefficient of variation in inner diameter of less than about 5%.
3. The microporous polyolefinic hollow fiber of claims 1, wherein said fiber has a coefficient of variation in wall thickness of less than about 7%; a coefficient of variation in inner diameter of less than about 3%; and an average ratio of maximum pore density to minimum pore density about the circumference of said fiber of less than about 2:1.
4. The microporous polyolefinic hollow fiber of claim 2, wherein said fiber comprises polypropylene or polyethylene having a melt index of from about 0.6 to about 8.
5. The microporous polyolefinic hollow fiber of claim 3, wherein said fiber comprises polypropylene or polyethylene having a melt index of from about 0.6 to about 8.

* * * * *